(12) United States Patent
Temple, III (10) Patent No.: US 8,320,256 B2
(45) Date of Patent: Nov. 27, 2012

(54) METHOD, COMPUTER PROGRAM PRODUCT AND SYSTEM FOR MANAGING USAGE OF MARGINAL CAPACITY OF COMPUTER RESOURCES

(75) Inventor: Joseph L. Temple, III, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 11/531,338

(22) Filed: Sep. 13, 2006

(65) Prior Publication Data

US 2008/0062890 A1 Mar. 13, 2008

(51) Int. Cl.
*G01R 31/08* (2006.01)
(52) U.S. Cl. .................................. 370/241; 370/259
(58) Field of Classification Search .................. 370/462, 370/458, 459, 465; 714/12, 13; 718/104
See application file for complete search history.

(56) References Cited

U.S. PATENT DOCUMENTS

| | | | |
|---|---|---|---|
| 7,111,297 B1 * | 9/2006 | Sankaranarayan et al. ... | 718/104 |
| 7,320,131 B1 * | 1/2008 | O'Toole, Jr. .................. | 718/104 |
| 2002/0129082 A1 * | 9/2002 | Baskey et al. ................. | 709/102 |
| 2002/0188576 A1 * | 12/2002 | Peterson et al. .............. | 705/400 |
| 2003/0028440 A1 * | 2/2003 | Allen et al. ..................... | 705/26 |
| 2004/0139037 A1 * | 7/2004 | Paleologo ...................... | 705/412 |
| 2004/0249763 A1 | 12/2004 | Vardi | |
| 2005/0010502 A1 | 1/2005 | Birkestrand et al. | |
| 2005/0138168 A1 * | 6/2005 | Hoffman et al. .............. | 709/224 |

\* cited by examiner

*Primary Examiner* — Kevin C Harper
*Assistant Examiner* — Henry Baron
(74) *Attorney, Agent, or Firm* — Cantor Colburn LLP; William A. Kinnaman, Jr.

(57) ABSTRACT

Utilization of at least one resource is managed in a computer system by monitoring usage of capacity of the computer resource, including monitoring usage of base capacity of the computer resource and marginal capacity of the computer resource exceeding the base capacity and determining whether usage of the computer resource exceeds a predetermined threshold. The determination may be based on an average usage of multiple computer resources over the predetermined time period. If usage of the computer resource exceeds the predetermined threshold, a charge for the usage of the computer resources is adjusted by an amount based on the usage of the computer resources exceeding the threshold.

11 Claims, 6 Drawing Sheets

| CPUs | | Marg. 1 | Marg. 2 | Marg. 3 | Marg. 4 | Marg. 5 | Marg. 6 | Marg. 7 | Marg. 8 |
|---|---|---|---|---|---|---|---|---|---|
| 1  | 1      |      |      |      |      |      |      |      |      |
| 2  | 1.949  | 0.49 |      |      |      |      |      |      |      |
| 3  | 2.878  | 0.32 |      |      |      |      |      |      |      |
| 4  | 3.789  | 0.24 |      |      |      |      |      |      |      |
| 5  | 4.681  | 0.19 |      |      |      |      |      |      |      |
| 6  | 5.553  | 0.16 |      |      |      |      |      |      |      |
| 7  | 6.407  | 0.13 |      |      |      |      |      |      |      |
| 8  | 7.242  | 0.12 |      |      |      |      |      |      |      |
| 9  | 8.057  | 0.10 |      |      |      |      |      |      |      |
| 10 | 8.854  |      | 0.49 | 0.48 |      |      |      |      |      |
| 11 | 9.631  |      | 0.39 | 0.41 |      |      |      |      |      |
| 12 | 10.389 |      | 0.32 | 0.35 | 0.48 |      |      |      |      |
| 13 | 11.129 |      | 0.27 | 0.31 | 0.42 |      |      |      |      |
| 14 | 11.849 |      | 0.23 | 0.28 | 0.37 | 0.47 |      |      |      |
| 15 | 12.55  |      | 0.20 | 0.25 | 0.33 | 0.42 |      |      |      |
| 16 | 13.232 |      | 0.18 | 0.22 | 0.30 | 0.38 | 0.47 |      |      |
| 17 | 13.962 |      | 0.16 | 0.20 | 0.28 | 0.35 | 0.42 | 0.46 |      |
| 18 | 14.692 |      | 0.15 | 0.19 | 0.25 | 0.32 | 0.39 | 0.42 | 0.45 |
| 19 | 15.422 |      | 0.13 | 0.17 | 0.23 | 0.29 | 0.36 | 0.39 | 0.42 |
| 20 | 16.152 |      | 0.12 | 0.16 | 0.21 | 0.27 | 0.33 | 0.37 | 0.40 |
| 21 | 16.882 |      | 0.11 | 0.15 | 0.20 | 0.26 | 0.31 | 0.34 | 0.38 |
| 22 | 17.612 |      | 0.10 | 0.15 | 0.19 | 0.24 | 0.29 | 0.33 | 0.36 |
| 23 | 18.342 |      |      | 0.14 | 0.19 | 0.23 | 0.28 | 0.31 | 0.34 |
| 24 | 19.072 |      |      | 0.13 | 0.18 | 0.22 | 0.27 | 0.30 | 0.33 |
| 25 | 19.802 |      |      | 0.13 | 0.17 | 0.22 | 0.26 | 0.29 | 0.32 |
| 26 | 20.532 |      |      | 0.12 | 0.17 | 0.21 | 0.25 | 0.28 | 0.31 |
| 27 | 21.262 |      |      | 0.12 | 0.16 | 0.20 | 0.24 | 0.27 | 0.29 |
| 28 | 21.992 |      |      | 0.11 | 0.15 | 0.19 | 0.23 | 0.26 | 0.28 |
| 29 | 22.722 |      |      |      | 0.15 | 0.18 | 0.22 | 0.25 | 0.27 |
| 30 | 23.452 |      |      |      | 0.14 | 0.18 | 0.21 | 0.24 | 0.27 |
| 31 | 24.182 |      |      |      | 0.13 | 0.17 | 0.21 | 0.23 | 0.26 |
| 32 | 24.912 |      |      |      | 0.13 | 0.17 | 0.20 | 0.22 | 0.25 |
|    |        |      |      |      | 0.12 | 0.16 | 0.19 | 0.22 | 0.24 |
|    |        |      |      |      | 0.12 | 0.15 | 0.18 | 0.21 | 0.23 |
|    |        |      |      |      | 0.12 | 0.15 | 0.18 | 0.21 | 0.23 |

FIG. 6

METHOD, COMPUTER PROGRAM PRODUCT AND SYSTEM FOR MANAGING USAGE OF MARGINAL CAPACITY OF COMPUTER RESOURCES

BACKGROUND

The present disclosure relates generally to utilization of computer resources, in particular managing capacity of resources in a computer system.

Computer systems have become sophisticated and powerful resources. Logically partitioned computer systems (LPARs) are examples of sophisticated systems that enable multiple users to run multiple applications simultaneously, using shared computer resources.

The full value of such a sophisticated computer system is best realized when several applications or workloads are sharing the computer system, driving its utilization very high. However, there are circumstances in which some users do not need the full capacity of a computer system, e.g., due to software pricing issues, geography, network bandwidth, etc. During such times, there is "white space", i.e., times during which the full capacity of the computer system is not used.

Figure 1:
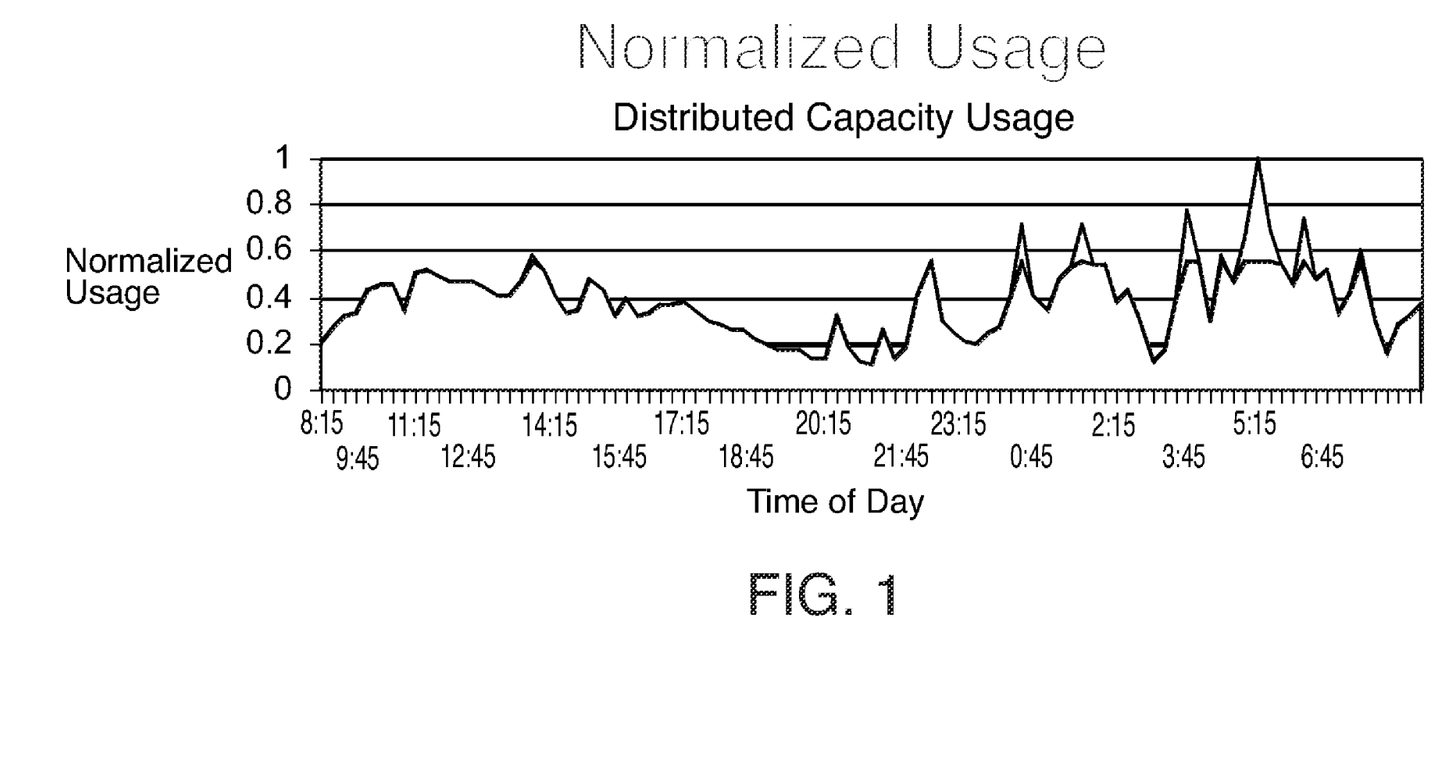
FIG. 1 graphically illustrates utilization of capacity in a traditional computer system.

FIG. 1 graphically illustrates variation of resource utilization over time in a traditional computer system. In FIG. 1, normalized usage of computer resource capacity distributed over various workloads is graphed over a 24 hour period. Over the time period represented in FIG. 1, the running average of computer resource usage varies significantly, with spikes in usage shown at various points during the day. To ensure that capacity is available for users during those peak periods of usage where the "spikey loads" occur, users are charged for the amount of capacity needed to provide those peak loads. Since the capacity that is needed for these peak periods is normally not being used, there is a lost of wasted "white space", i.e., unused capacity, represented by the area in FIG. 1 outside the graph of the actual usage over time. This "white space" corresponds to a lot of paid for but unused capacity.

In traditional computer systems, usage of the computer system is kept high by using and sharing all the "white space", i.e., unused capacity, that is available. For this reason, computer systems are often "softcapped", i.e., there is not a cap on the usage of resources for any given user, as long as there is capacity available on the system. This presents a problem for a user that has paid for capacity but is not using it, as the unused capacity is then made available to another user that has not paid for it. The user that has paid for the capacity does not get the full value, and the user that has not paid for the capacity is unfairly enriched.

When a system is first brought on line, particularly in a consolidation effort when there are relatively few applications on the system, the workload will be "spiky". In this case the customer is not getting full value from the machine until it is fully loaded. For a variety of reasons, such as isolation of work for software licensing purposes, isolation policy (largely security driven), or the nature of the workload, some workloads are not heavily shared.

There is thus a need to maximize usage of resources of a computer system while fairly managing the capacity of computer resources provided to various users. Furthermore, there is a corresponding need by the owner of the computer resource to purchase capacity in the same manner. That is, it would desirable for the owner to be able to purchase base capacity for anticipated normal loads plus marginal capacity for spikey loads. Furthermore, it would be desirable for the owner to float the marginal capacity between computer resources.

SUMMARY

According to an exemplary embodiment, methods, computer program products and systems manage utilization of at least one resource in a computer system. Usage of capacity the computer resource is monitored, including usage of base capacity of the computer resource and marginal capacity of the computer resource exceeding the base capacity. A determination is made whether usage of the computer resource exceeds a predetermined threshold. If usage of the computer resource exceeds the predetermined threshold, a charge for the usage of the computer resources is adjusted by an amount based on the usage of the computer resources exceeding the threshold.

According to one embodiment, the determination may be based on an average aggregate usage of multiple computer resources exceeding the predetermined threshold.

Other methods, computer program products, and/or system according to embodiments will be or become apparent to one with skill in the art upon review of the following drawings and detailed description. It is intended that all such additional methods, computer program products, and/or systems be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 illustrates granular control of usage of computer resources over time based on needed capacity.

The detailed description explains the exemplary embodiments, together with advantages and features, by way of example with reference to the drawings.

DETAILED DESCRIPTION

According to exemplary embodiments, usage of a computer system is optimized and users are fairly charged for usage of resources by offering a "marginal capacity" of resource, in addition to the base capacity of resources, and monitoring usage of the marginal capacity such that the user is appropriately charged only for the marginal capacity actually used by that user. In the description that follows, the term "resources" includes various software/hardware included in the computer system and needed for running applications. For a zSeries system, these resources may include but are not limited to Central Processor Units (CPUs), Internal Coupling Facilities (ICF), Integrated Facility for Linux (IFLs), memory, storage and other I/O resources (e.g., channels, SAPs and OSA (network cards)).

According to an exemplary embodiment, the introduction of marginal capacity allows a "hard capped" computer system to be used such that the capacity of resources that one user pays for cannot be used by another user that has not paid for it.

According to exemplary embodiments, the capped capacity may be set as a share of the base capacity plus the marginal capacity for each user, compared with traditional softcapped LPARS system, which only keep track of the total capacity of the system.

According to an exemplary embodiment, computer resource capacity is provided to a user by determining the capacity needed to cover a peak workload. This capacity may be referred to as an "enabled capacity or a "total capacity". A base capacity is that portion of the enabled/total capacity that is considered a minimum amount needed for normal usage. The base capacity may be determined by determining a target running average peak over a given time period, e.g., 4 hours. A safety factor may also be included. If the average peak over the time period+the safety factor is less than a predetermined percentage of the enabled capacity, e.g., less than 60%, the base capacity may be set to that predetermined percentage. Otherwise, the base capacity may be set to the calculated value. The customer can then use "marginal capacity" as needed, but only for short duration peaks, e.g., during times of peak usage.

According to the exemplary embodiments the total capped "base capacity is sold to the customer by the hardware vendor at a "normal rate" and "marginal capacity" or difference between the total capacity and the capped "base capacity" is sold at a discounted rate. The discount reflects the difference in value between capacity that can be fully utilized and that which can only be used in short interval spikes.

According to one embodiment, a customer can be charged for marginal capacity only when it is used. This may referred to as an "on demand" rental model. In this type of model, a hardware vendor may rent the additional base capacity or total capacity to the owner of the computer resource (also referred to herein in as "machine") on demand, and these charges may be passed through to the user causing the peak.

According to another embodiment, a customer can be charged for marginal capacity up front, and a governor may cap the usage by monitoring the running average and then limiting, cutting off, or hard-capping the computer resource (machine) to the base capacity if the "spike" in usage turns into a period of sustained usage. This may be accompanied by either an automatic or a user controlled increase in base capacity. This is described in more detail below.

As briefly described above, the marginal capacity may be charged for at a discounted rate. The charge for usage of the base capacity and the marginal capacity may be determined by adding the price for the base capacity plus 1/n the price of the base capacity, where n is an integer that can be set as appropriate. As an example, "n" may be set at 4, so that the charge for use of the marginal capacity is 25% of the price charged for base capacity. The calculation of the price for usage of the base capacity and the marginal capacity is represented by the formula below, where capacity is indicated in units of MIPS ("Millions of Instructions per Second"), the unit of relative capacity for a zSeries system).

$$\text{Price} = \text{Price/MIPS}(\text{Base MIPs} + 1/n \text{ Marginal MIPs}).$$

According to an exemplary embodiment, this price is the price that the user pays for usage of the base capacity and the marginal capacity of the computer resources, unless the capacity used exceeds a predetermined threshold over a period of time. In such a case, the user may, for example, either purchase the capacity exceeding the predetermined threshold over the period of time or may rent the additional capacity.

While in the zSeries System, the units of capacity is "MIPS", and the calculation of prices would be on a dollars per MIPS basis, it should be appreciated that any other unit of capacity may be chosen. It should be noted, though, that when the pricing is based on a unit of capacity rather than on a count of physical entities, a more flexible approach to pricing can be pursued. In many systems the price of the nth processor is the same as the price of the first processor. The zSeries System, by comparison, uses the MIPS ratings of the machine to set the prices. As a result, the incremental price per MIPS is constant but the price of a CPU decreases as CPUs are added or enabled. According to an exemplary embodiment, a similar notion of pricing for capacity may be used, but the customer is allowed to pay full price for as little as, e.g., 60% of the capacity of the purchased CPUs machine and marginal capacity pricing for the remainder. This reduces the price the customer pays for the machine initially, though it may restrict the customer's use of the marginal part of the capacity to short term spikes or causes the customer to pay for long duration peaks at more expensive rental prices.

Figure 2:
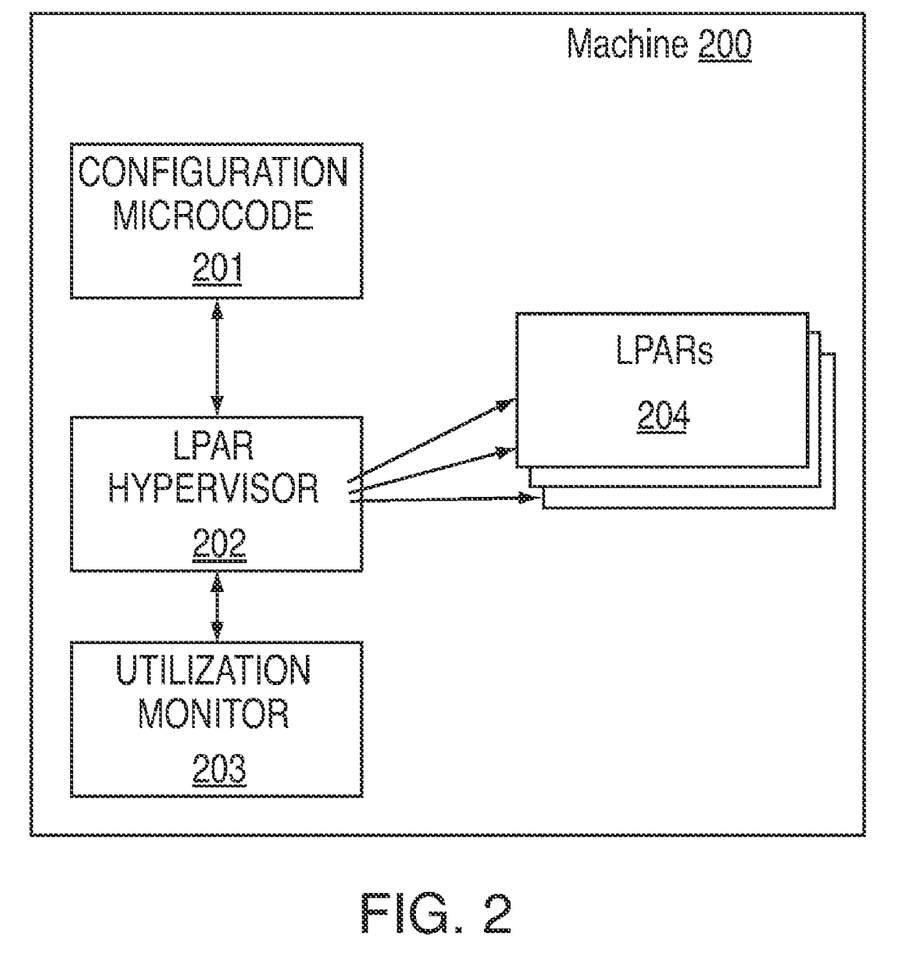
FIG. 2 is diagram of a system for managing usage of capacity.

FIG. 2 illustrates an exemplary system for monitoring usage of capacity. In this system, a machine 200 (or computer resource) includes a Utilization Monitor 203 that monitors capacity usage and reports this information to the LPAR Hypervisor 202. Although not shown, there may also be workload managers running within the LPARs 204.

The machine 200 also includes Configuration microcode 201 which contains information indicating the number of enabled CPUs (engines) (total capacity) and the base capacity utilization limit set. This limit may be set, e.g., at the factory or may be purchased via a field upgrade. In an exemplary embodiment, the Configuration microcode 201 communicates this limit either to the LPAR Hypervisor 202 or directly to the Operating Systems workload managers running within the LPARs 204.

In the first case, the hard-cap parameters in Configuration microcode 201 may be manipulated so that LPAR Hypervisor 202 caps all LPARs 204 when the base capacity threshold is reached unless an automatic rental of capacity purchased, in which case the Configuration microcode 201 processes a rental or purchase upgrade for additional base capacity. For example, once the rental/upgrade threshold is detected, a web connection to the configuration microcode 201 can be used to interact with the vendor to automatically secure the upgrade. Those skilled in the art will appreciate that there may be other ways for processing a rental or purchase grade, the details of which are omitted here for the sake of brevity.

Figure 3:
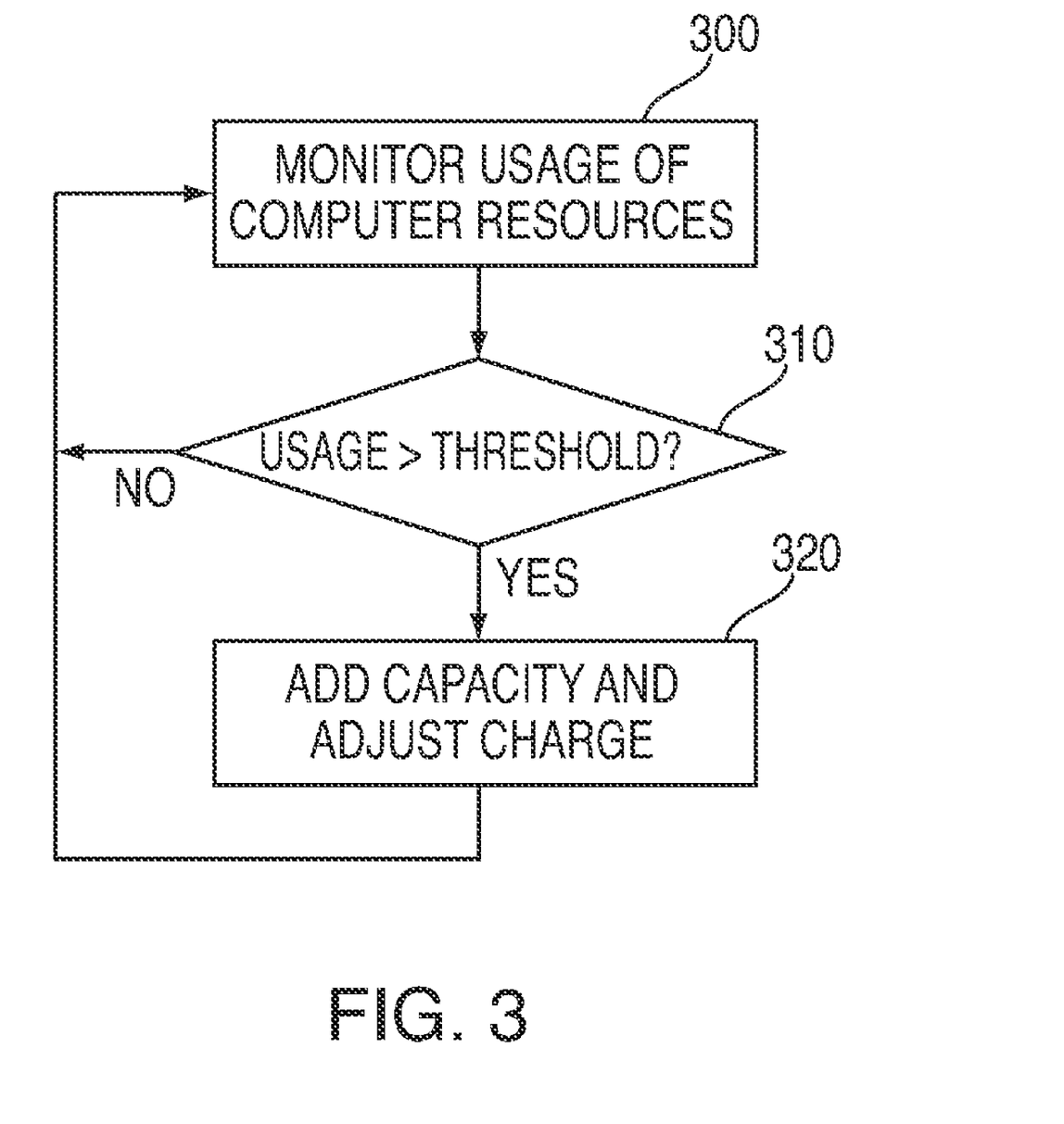
FIG. 3 is flow diagram of a method for managing usage of marginal capacity according to an exemplary embodiment.

In the second case, the operating system in each LPAR 204 communicates with the Configuration microcode 201 and imposes a cap through the workload manager function of the operating system. The basic mechanism for capping an LPAR this way is described in detail in various IBM publications for setting an LPAR's "defined capacity". For more details, the reader is directed to http://www-03.ibm.com/servers/eserver/zseries/swprice/scpt/. Again, this capping is done unless an automatic upgrade purchase or rental is implemented FIG. 3 illustrates a flow diagram of a process for managing usage of at least one resource in a computer system. At step 300, usage of the computer resources is monitored. This monitoring includes monitoring usage of the base capacity of the computer resource provided to the user and use of any marginal capacity of the computer resource exceeding the base capacity over a predetermined time period. This marginal capacity may be reserved for the user and activated when needed either automatically by the computer system, e.g., via a Remote Support Facility (RSF) or via a password panel on the user side. At step 310, it is determined whether usage of the computer resource exceeds a predetermined threshold over the predetermined time period. According to an exemplary embodiment, this predetermined threshold may be the base capacity. If usage of the computer resource exceeds a predetermined threshold, capacity reserved for usage by the user is added, and a charge for the usage of the computer resource is adjusted at step 320. Although not shown, it should be appreciated that a step of reducing capacity as the usage reaches the predetermined threshold may be added to avoid usage of (and the corresponding charge for) marginal capacity. According to an exemplary embodiment, the adjustment is based on the usage of the marginal capacity. If usage of the computer resource does not exceed the predetermined threshold, the process returns to step 300. Also, after the charge is adjusted at step 320, the process resumes at step 300.

According to an exemplary embodiment, multiple machines may interact across which capacity may "float", such that a user is not needlessly charged for usage of additional capacity. That is, the aggregate usage of the multiple machines may be accumulated to determine whether the base capacity usage exceeds the predetermined threshold. This allows individual resources to run at high capacity without the restrictions of limited interval peaks. For this purpose, the Utilization Monitor 203 (FIG. 2) communicates usage values to the Configuration Microcode 201 (directly or via, e.g., the LPAR Hypervisor 202), and the Configuration Microcode uses a service network interface to aggregate the total utilization value. Then, a signal is propagated either to the OS's in the LPAR's 204 or to the LPAR Hypervisor 202, triggering the capping mechanisms. In this manner, the defined capacities or the hard caps are manipulated to float the base capacity between the machines.

Figure 4:
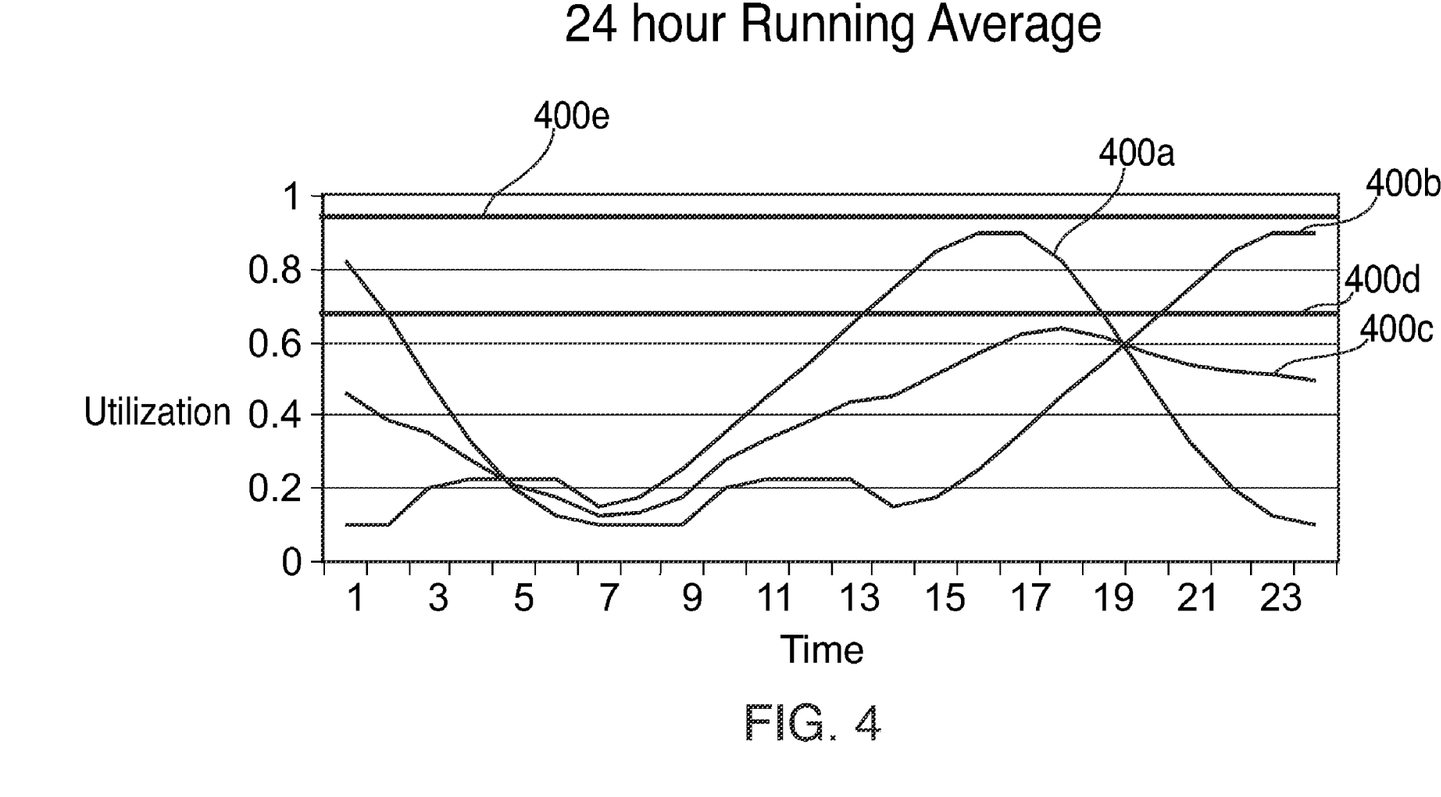
FIG. 4 graphically illustrates usage of multiple computer resources over time.

For example, consider multiple computer resources running over a 24 hour time period, as graphically represented in FIG. 4. In FIG. 4, usage of a resource in California and usage of a resource in Europe are represented by lines 400a and 400b, respectively. The average aggregated usage of the resources in both California and Europe is represented by the line 400c. The base capacity is represented by line 400d, and the marginal capacity is represented by line 400e. As can be seen from FIG. 4, the average aggregate usage of the resources over 24 hours (400c) is less than the base capacity (400d). Thus, while the marginal capacity usage of the individual resource in Europe exceeds the base capacity over the 24 hour time period, the charge for this usage may be avoided by averaging the usage of the resource in Europe with the usage of the resource in California, such that the aggregate usage is less than the base capacity. Accordingly, the user is not charged for the marginal capacity usage exceeding the base usage over the 24 hour time period.

According to another embodiment, the usage of capacity can be automatically reduced so that it does not exceed the predetermined threshold. This may be done a user or by the computer system by throttling latent demand and avoiding sustained usage beyond the relative (base) capacity, unless the marginal capacity is really needed. In one embodiment, this may be accomplished by driving an automated hardware console interface with a script that varies CPUs on and off according to the user's daily usage cycle using, e.g., a hardware console with an external "programmed operator" application program interface (API). The script may vary resources on line and off line according to the usage demand as determined by the transaction throughput.

Figure 5:
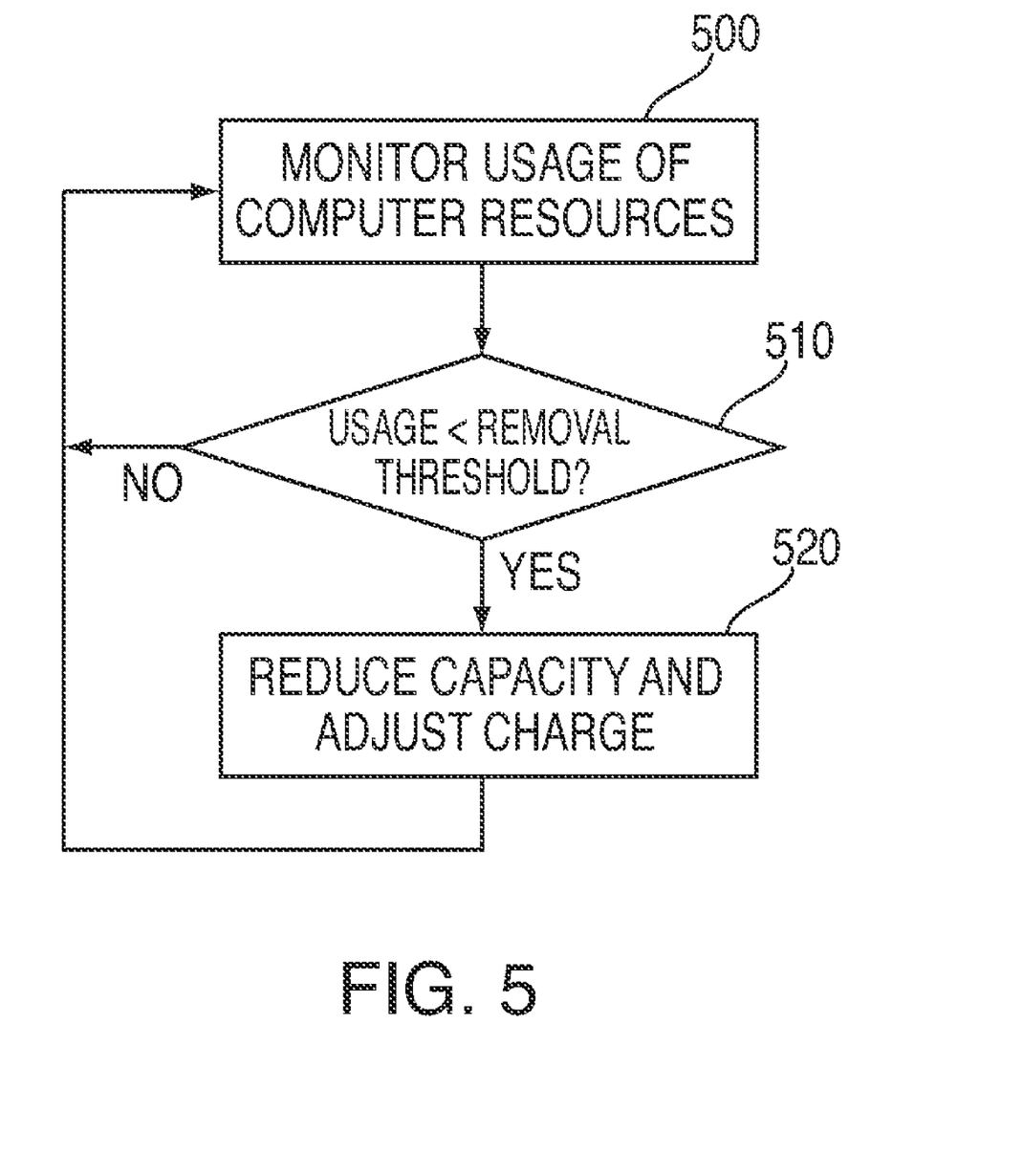
FIG. 5 is a flow diagram of a method for managing usage of marginal capacity according to another exemplary embodiment.

FIG. 5 illustrates a flow chart for an alternative method of monitoring and adapting capacity according to an exemplary embodiment. As in FIG. 3, the method begins at step 500, at which the usage of computer resources is monitored. At step 510, a determination is made whether the usage falls below a predetermined removal threshold. If so, the capacity of computer resources reserved for the user is reduced, and the charge for computer resource usage is adjusted at step 520. From step 520 or from a determination that the usage does not fall below the predetermined threshold at step 510, the process returns to step 500, and monitoring of usage continues. Although only decision block 510 is shown in FIG. 5 for simplicity, it should be appreciated that there may be multiple decision blocks and removal thresholds as described in more detail below.

Although not illustrated, it should be appreciated that the processes shown in FIGS. 3 and 5 may be used together. That is, capacity may be increased/decreased and charges may be adjusted as appropriate, based on monitored usage of capacity. In this manner, users are provided with adequate capacity at a fair price.

According to exemplary embodiments, control of computer resource usage is enhanced. This may be understood with reference to FIG. 6 which illustrates control of usage of resources or "CPUs" over time to avoid usage over the predetermined threshold. In the illustrative example depicted in FIG. 6, a user purchases five CPUs providing a base capacity, and the user is provided with two additional CPUs offering marginal capacity. The two additional CPUs offer 39% marginal capacity, so the threshold of capacity at which the user is charged for additional capacity is approximately 60% utilization. Assuming a linear growth of throughput with utilization, the user establishes removal thresholds at which to remove or cease use of CPUs. For example, the user may set 80% capacity usage as the threshold for removing a first CPU and another threshold for removing the second CPU (e.g., around 75% usage of the capacity remaining after removal of the first CPU). As can be seen from FIG. 6, as more CPUs are involved, the granularity of control gets finer. According to an exemplary embodiment, an automatic operator may turn the CPUs off as the removal thresholds are reached. If these thresholds are reached on a predictable routine basis, e.g., every day at the same time, a schedule for removal of the CPUs can be built. Alternatively, a running average over a period of time, e.g., a 3 hour running average, can be observed, and if the average exceeds the threshold at which the user's charges for capacity are adjusted, criteria can be built to throttle the capacity enough to force the running average back below the threshold. These activities may be performed by the user or may be automatically performed by the capacity manager.

As described above, managing marginal capacity provides several advantages for a user, particularly in terms of cost savings. In order to optimize the offering marginal capacity, it is important to have a mechanism for updating computer systems, in particular legacy systems. According to an exemplary embodiment, upgrades may be provided at a price based on the total increased capacity value, considering the value of both the base and the marginal capacity. For example, traditional computer resource machines have a model/feature indicating capacity. This is typically given by a model type plus CPU count. Similarly, according to one embodiment, a model type and a CPU count may be provided for the base capacity, and there may also be a CPU count for the marginal capacity. This makes it easy to determine the price of an upgrade, as it can be based on the CPU count of the base capacity plus the CPU count of the marginal capacity.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium or loaded into and/or executed by a computer wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for managing utilization of at least one resource in a computer system, comprising:
   at a utilization monitor, monitoring usage of capacity of the computer resource, including monitoring usage of base capacity of the computer resource and marginal capacity of the computer resource which accommodates usage exceeding the base capacity for a predetermined time period;
   reporting the usage of capacity of the computer resource to an LPAR hypervisor;
   determining whether usage of the computer resource over the predetermined time period exceeds a predetermined threshold; and
   if the usage of the computer resource temporally exceeds the predetermined threshold automatically ceasing usage of at least a portion of the marginal capacity;
   if usage of the computer resource exceeds the predetermined threshold for a duration, allocating marginal capacity and adjusting a charge for the usage of the computer resources by an amount based on the usage of the computer resources exceeding the threshold;
   wherein the predetermined threshold is the base capacity, and the adjusting is based on the usage of marginal capacity exceeding the base capacity;
   wherein usage of the base capacity is charged at a base rate (Base Million Instructions Per Second (MIPS)), and usage of the marginal capacity is charged at a discounted rate (Marginal MIPS);
   wherein the charge for the usage of the computer resources is defined as (Price/MIPS)(Base MIPs+(1/n)*(Marginal MIPs));
   where n is an integer.

2. The method of claim 1, wherein the step of adjusting includes automatically renting or selling to the user the usage of the computer resource that exceeds the predetermined threshold.

3. The method of claim 1, wherein the step of determining includes determining whether an average aggregate usage of multiple computer resources exceeds the predetermined threshold, and if the average aggregate usage of the multiple computer resources exceeds the predetermined threshold, a charge for the usage of the computer resources is adjusted by an amount based on the average aggregate usage of the multiple computer resources exceeding the predetermined threshold.

4. The method of claim 1, further comprising causing the capacity of the computer resource to be automatically reduced if the usage reaches the predetermined threshold.

5. A non-transitory computer-readable storage medium having instructions for causing a computer to:
   monitor usage of capacity of a computer resource in a computer system, including monitoring usage of base capacity of the computer resource and marginal capacity of the computer resource exceeding the base capacity, over a predetermined time period;
   determine whether usage of the computer resource over the predetermined time period exceeds a predetermined threshold;
   if the usage of the computer resource temporally exceeds the predetermined threshold automatically ceasing usage of at least a portion of the marginal capacity;
   if usage of the computer resource exceeds the predetermined threshold for a duration, allocating marginal capacity and adjusting a charge for the usage of the computer resources by an amount based on the usage of the computer resources exceeding the threshold;
   wherein the predetermined threshold is the base capacity, and the adjusted charge is based on the usage of marginal capacity exceeding the base capacity;
   wherein usage of the base capacity is charged at a base rate (Base Million Instructions Per Second (MIPS)), and usage of the marginal capacity is charged at a discounted rate (Marginal MIPS);
   wherein the charge for the usage of the computer resources is defined as (Price/MIPS)(Base MIPs+(1/n)*(Marginal MIPs));
   where n is an integer;
   wherein the computer readable medium causes the computer to automatically cease usage of at least a portion of the marginal capacity when usage of the marginal capacity exceeds a duration and adjust the charge for continued usage of the computer resources for extending use of the marginal capacity.

6. The non-transitory computer-readable storage medium of claim 5, wherein the computer readable medium causes the computer to automatically rent or sell to the user the usage of the computer resource that exceeds the predetermined threshold.

7. The non-transitory computer-readable storage medium of claim 5, wherein the computer readable medium causes the computer to determine whether an average aggregate usage of multiple computer resources exceeds the predetermined threshold and, if the average aggregate usage of the multiple computer resources exceeds the predetermined threshold, adjust a charge for the usage of the computer resources by an amount based on the average aggregate usage of the multiple computer resources exceeding the predetermined threshold.

8. The non-transitory computer-readable storage medium of claim 5, wherein the computer readable medium causes the computer to automatically reduce usage of the computer resource if the usage reaches the predetermined threshold.

9. A system for managing utilization of at least one resource in a computer system, the system comprising:
   a usage monitor for monitoring usage of capacity of the computer resource, including monitoring usage of base capacity of the computer resource and marginal capacity of the computer resource exceeding the base capacity over a predetermined time period; and
   a processor for determining whether usage of the computer resource over the predetermined time period exceeds a predetermined threshold,
   if the usage of the computer resource temporally exceeds the predetermined threshold automatically ceasing usage of at least a portion of the marginal capacity;
   if usage of the computer resource exceeds the predetermined threshold for a duration, allocating marginal capacity and adjusting a charge for the usage of the computer resources by an amount based on the usage of the computer resources exceeding the threshold;
   automatically ceasing usage of at least a portion of the marginal capacity when usage of the marginal capacity exceeds a duration and adjusting the charge for continued usage of the computer resources for extending use of the marginal capacity;
   wherein the predetermined threshold is the base capacity, and the adjusting is based on the usage of marginal capacity exceeding the base capacity;
   wherein usage of the base capacity is charged at a base rate (Base Million Instructions Per Second (MIPS)), and usage of the marginal capacity is charged at a discounted rate (Marginal MIPS);
   wherein the charge for the usage of the computer resources is defined as (Price/MIPS)(Base MIPs+(1/n)*(Marginal MIPs));
   where n is an integer.

10. The system of claim 9, wherein the processor determines whether an average aggregate usage of multiple computer resources exceeds the predetermined threshold and, if the average aggregate usage of the multiple computer resources exceeds the predetermined threshold, adjusts a charge for the usage of the computer resources by an amount based on the average aggregate usage of the multiple computer resources exceeding the predetermined threshold.

11. The system of claim 9, wherein the processor automatically reduces usage of the computer resource if the usage reaches the predetermined threshold.

* * * * *